J. W. Hilton,
Lock Nut.
No. 88,385.   Patented Mar. 30, 1869.
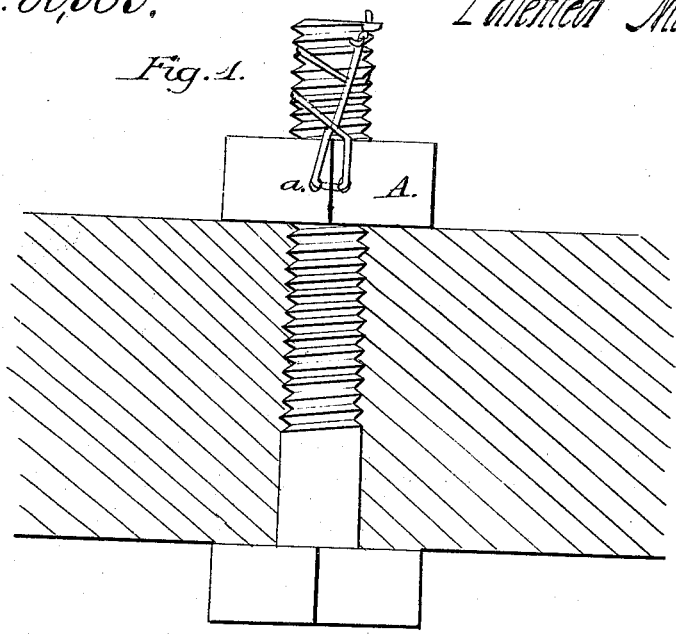
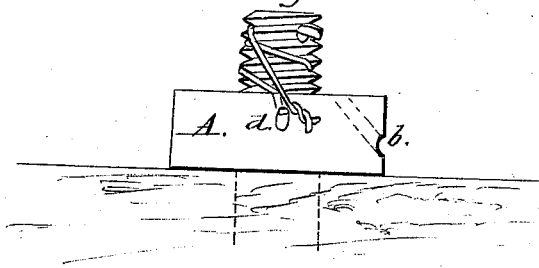
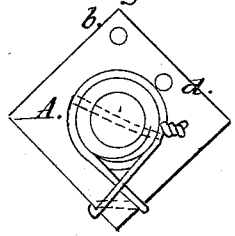
Witnesses:
Wm. A. Morgan
G. C. Cotton
Inventor:
J. W. Hilton

JAMES W. HILTON, OF BRADFORD, PENNSYLVANIA.

Letters Patent No. 88,385, dated March 30, 1869.

---

IMPROVEMENT IN LOCK-NUTS.

---

The Schedule referred to in these Letters Patent and making part of the same.

---

*To all whom it may concern:*

Be it known that I, JAMES W. HILTON, of Bradford, in the county of McKean, and State of Pennsylvania, have invented a new and improved Method of Fastening Bolt-Nuts; and I do hereby declare that the following is a full, clear, and exact description thereof, which will enable those skilled in the art to make and use the same, reference being had to the accompanying drawings, forming part of this specification, in which—

Figure 1 is a side view of a nut and bolt, having my improved fastening-devices.

Figure 2 is a similar view, differing only in the perforation employed.

Figure 3 is a top view of fig. 1.

Similar letters of reference indicate corresponding parts.

The object of this invention is to provide a means by which nuts may be securely fastened on their bolts, and thus be prevented from becoming loose, and unscrewing from their bearings, when subjected to severe vibration or straining, as in the case of those nuts used on locomotives and other fast-moving machinery.

I accomplish the fastening of the nut by means of a copper or other pliable wire, and to this end, the nut is perforated in any suitable place, and also the end of the bolt.

The nut is screwed down to the desired bearing, and the wire passed through the perforation in the nut.

One part of the wire is then wound around the thread, in a contrary direction to the thread; that is to say, when the thread is to the left, the wire is wound to the right, and the reverse when the thread runs to the right.

The part thus wound is passed through the hole, near the end of the bolt, and locked by twisting, with the straight part brought up from the perforation in the nut. This is shown in fig. 1, where A is the nut, and the wire is shown in red color.

The nut may be perforated in any suitable place.

I employ chiefly a corner perforation, as shown in fig. 1, and side perforation, as shown in fig. 2.

With the side perforation, the wire is entered at the side of the nut, and emerges from the top of the same, near the bolt, as shown in fig. 3.

The corner perforations may be either vertical or horizontal, as desired; that is to say, the said perforations may pass from side to side, through the corner, as shown at *a*, fig. 1, or they may pass from corner to bottom, as shown at *b*, figs. 2 and 3.

The side perforation is shown at *d*.

The manner of passing the wire is shown at fig. 2.

By means of this wire, it will be evident that the nut is held from turning away from its bearing.

I claim as new, and desire to secure by Letters Patent—

The combination of a perforated bolt, a perforated nut, and a wire, bent and locked, substantially as and for the purpose shown and described.

The above specification of my invention signed by me, this 6th day of June, 1868.

JAMES W. HILTON.

Witnesses:
FRANK BLOCKLEY,
ALEX. F. ROBERTS.